United States Patent [19]

Ball et al.

[11] 4,411,745

[45] Oct. 25, 1983

[54] ELECTROLYTIC INITIATION OF POLYMERIZATION IN AQUEOUS TWO-PHASE SYSTEMS

[75] Inventors: Lawrence E. Ball, Cuyahoga Falls; Martin A. Pichler; V. Frances Gaylor, both of Parma, all of Ohio

[73] Assignee: The Standard Oil Company, Cleveland, Ohio

[21] Appl. No.: 336,534

[22] Filed: Jan. 4, 1982

[51] Int. Cl.$^3$ ............................ C25B 3/02; C25B 3/00
[52] U.S. Cl. ..................................... 204/59 R; 204/72
[58] Field of Search ................. 204/59 R, 79 R, 72; 526/91, 93

[56] References Cited

U.S. PATENT DOCUMENTS

| | | | |
|---|---|---|---|
| 2,726,204 | 12/1955 | Park et al. | 204/72 |
| 3,464,960 | 9/1969 | Sobieski | 526/91 |
| 3,554,882 | 1/1971 | Hodes | 204/72 |
| 3,567,601 | 3/1971 | Lucas | 204/78 |
| 3,573,180 | 3/1971 | Hodes | 204/72 |
| 4,326,049 | 4/1982 | Rasmussen | 526/91 |

OTHER PUBLICATIONS

Kolthoff et al., Jour. of Poly. Sci., vol. VI, No. 5, pp. 563-574.

Primary Examiner—John F. Niebling
Attorney, Agent, or Firm—Salvatore P. Pace; Herbert D. Knudsen; Larry W. Evans

[57] ABSTRACT

Ethylenically unsaturated monomers are polymerized by an indirect process which electrolytically initiates the polymerization. The indirect electrolytic polymerization process utilizes a free radical initiator and an electron transfer agent in a two-phase system capable of carrying an electric current.

22 Claims, No Drawings

ELECTROLYTIC INITIATION OF POLYMERIZATION IN AQUEOUS TWO-PHASE SYSTEMS

BACKGROUND OF THE INVENTION

1. Field of the Invention

The present invention relates to an indirect process for electrolytically initiating the polymerization of ethylenically unsaturated monomers. More specifically, the present invention provides an indirect electrolytic polymerization process utilizing a free radical initiator and an electron transfer agent in a two-phase system capable of carrying an electric current.

2. Description of Art

Direct electrolytic polymerization processes are well known. For example, it is known that polymerization can be initiated electrolytically by passing an electric current between an anode and a cathode contained in a suitable mixture. Such mixtures are generally one phase and include monomers and electrolytes. However, such polymerizations have not been entirely satisfactory in that they require high amounts of energy to initiate polymerization and have limited utility in that polymerization occurs at the surface of an electrode eventually coating the electrode and blocking the current passage through the system. Further, many of these electrochemical polymerization processes have been used only with monomers present in concentrations which are completely soluble in the electrochemical mixture.

Indirect electrolytic polymerization processes, those which do not directly utilize electrode reactions for generating the active initiating species, have been more recently developed. Typically, these polymerizations utilize an electron transfer which allows polymerization to occur in the medium and not at an electrode surface. However, present indirect electrolytic polymerizations are restricted by the solubility limits of the monomers employed and require high concentrations of the electron transferrer.

The general object of this invention is to provide an electrolytically initiated polymerization process for polymerizing ethylenically unsaturated monomers. Another object of the invention is to provide an electrolytically initiated polymerization process capable of polymerizing ethylenically unsaturated monomers in concentration above their solubility limits. A further object of the invention is to provide an electrolytic initiated polymerization process utilizing a two-phase system capable of carrying an electric current and containing low concentrations of electron transfer agents and polymerization initiator sources. A still further object of the present invention is to provide an electrolytic initiated polymerization process which utilizes a recycleable electron transfer agent.

SUMMARY OF THE INVENTION

The present invention provides an indirect process for electrolytically initiating the polymerization of ethylenically unsaturated monomer(s) by passing an electric current through a two-phase system comprising: (a) an organic phase, (b) a continuous aqueous phase capable of carrying an electric current, (c) a free radical source capable of forming a polymerization initiator, and (d) an electron transfer agent.

The present invention further provides an electrolytic initiated polymerization process which exhibits high polymerization rates and yields. This process can be regulated by controlling the electric current flow through the electrochemical system and is highly economical since it employs low amounts of energy.

DETAILED DESCRIPTION OF THE INVENTION

The two-phase system through which the electric current is passed is comprised of a discontinuous organic phase and a continuous aqueous phase. The organic phase is comprised of the ethylenically unsaturated monomer(s) and/or the product polymer. The continuous aqueous phase is comprised of an electron transfer agent, an aqueous medium and optionally an emulsifying or dispersing agent. The free radical polymerization initiator source may be present in either phase.

Any ethylenically unsaturated polymerizable monomer can be used in the process of the present invention. These monomers are generally known to those skilled in the art of polymerization as vinyl monomers. Most importantly, the process of the present invention is specifically adapted to polymerize monomers in aqueous systems in concentrations above the solubility limits of the monomer. Illustrative of the polymerizable monomer or monomers used are acrylic compounds, substituted acrylic compounds, conjugated diene compounds and aromatic unsaturated compounds. Examples of these monomers include but are not limited to vinyl acetate, vinyl chloride, vinyl toluene, vinyl naphthalene, vinyl diphenyl, acrylonitrile, methacrylonitrile, methyl acrylate, methyl methacrylate, styrene, alpha-methyl styrene, acrylamide, N-N'-methylene bisacrylamide, N-vinyl-2-pyrrolidone, butadiene-1,3, isoprene, chloroprene, bromoprene, cyanoprene, 2,3,-dimethyl butadiene-1,3, 2-ethyl butadiene-1,3 and the like. The monomers can be used individually, such as in the production of homopolymers, or can be used in various combinations, such as in the production of copolymers or multipolymers. Further, insoluble monomers or monomers with low solubility can be used in combination with highly soluble monomers.

Monomer combinations which work particularly well in the process of the present invention comprise a major portion of an ethylenically unsaturated nitrile, such as acrylonitrile, and a minor portion of a monomer capable of forming a copolymer therewith, such as an ester of an ethylenically unsaturated carboxylic acid, optionally polymerized in the presence of a rubbery polymer. The rubbery polymer is typically composed of a major portion of a conjugated diene monomer, such as butadiene, and optionally a minor portion of a monomer capable of forming a copolymer therewith, such as an ethylenically unsaturated monomer or another conjugated diene monomer.

Any material capable of generating free radical intermediates through reduction/oxidation reactions can be utilized as a polymerization initiator in the process of the present invention. Generally, the polymerization initiators are free radical intermediates which are formed by the reduction of oxidizing agents which require two or more electrons to reach a new stable state. When the initiators accept only one electron, they become unstable free radical intermediates which initiate polymerization. Typically, peroxides, persulfates, perborates, perphosphates and hydroperoxides have been found to be suitable polymerization initiator sources. Preferred are the peroxide and the persulfate salts and most preferred are hydrogen peroxide, potassium persulfate and para-menthane hydroperoxide.

The electron transfer agents used are generally those that remain soluble in aqueous systems in at least two valence states. Typically they are reducing metals having at least three valence states. As used herein, valence states include the 0 valence metallic state. By utilizing reducing metals having at least three valence states, electrons can be transferred between the electrode, electron transfer agent and polymerization initiator without exhausting the electron transferring system. Typical metal electron transfer agents include iron, cobalt, nickel, copper, ruthenium, rhodium, palladium, iridium, platinum, gold, rhenium and the like. Preferred are iron, cobalt and copper and most preferred is iron.

Unlike other electrochemically initiated polymerization systems, both the cathode and the anode are inert with respect to the monomer system. Suitable cathodes and anodes are well known in the art. Typically, suitable anodes include but are not limited to platinum, carbon, lead, dimensionally stable anodes and various semi-conductors. Suitable cathodes include but are not limited to iron, platinum, copper, graphite, mercury, lead, tin, aluminum and nickel.

In order to retain a dispersed two-phase system throughout polymerization, a suitable emulsifying or dispersing agent is preferably employed. Depending upon the specific electrochemical system employed, the emulsifying or dispersing agent may also function as an electrolyte. Various emulsifying or dispersing agents can be used in the process of the present invention and are well known to those skilled in the art. Typically, suitable emulsifying or dispersing agents may be ionic or non-ionic and include alkyl or aryl sulfates, sulfonates, phosphates, carboxylates and the like.

The volume ratio of continuous to discontinuous phase in the electrochemical system can vary widely. For example, in the process of the present invention, the discontinuous phase can surprisingly comprise up to about 70%, preferably 50% and most preferably 40% by volume of the overall system. This high volume of monomer-containing discontinuous phase gives the process of the present invention greater flexibility than other electrolytically initiated polymerization systems by providing for a high capacity of polymer production while utilizing monomers with various solubilities.

The process parameters of the present invention can also vary widely. Any temperature can be employed, although it is preferred to use temperatures below the thermal activation temperature of the free radical source and above the freezing point of the electrochemical medium. Depending upon the particular system chosen, the temperature will typically range from 0° C. to about 75° C., preferably 20° C. to 60° C. Any pressure can be employed which allows the reactants and the medium to remain in a liquid state throughout the reaction. The atmosphere is essentially oxygen free and preferably inert. Any inert atmosphere can be employed and typically inert gases include nitrogen, helium, argon, krypton and the like. Further, the indirect electrolytic polymerization can be performed via either controlled current or constant potential.

Although not intending to be bound to theory, it is believed that the process of the present invention utilizes a reaction at the electrode which generates an electron transfer agent capable of activating a free radical generating source and producing a free radical intermediate. The free radical intermediate subsequently initiates the polymerization. More particularly, it is believed that the electron transfer agent accepts an electron from the cathode and transfers the electron to the free radical generating source. The free radical generating source accepts the electron becoming a free radical intermediate and initiates polymerization. Thus, this indirect electrolytically initiated polymerization is activated only in the presence of an electric current. Further, the amount of the electric current will control the extent of the electrochemical reaction and, therefore, the rate of polymerization. The reaction can be stopped by discontinuing the electric current although the reaction will continue for a short period until the activated electron transfer agents and free radical initiators are exhausted. Thus, a batch mode operation can be employed.

A particular advantage of the process of the present invention is that the electron transfer agent is recycleable. By recycling the electron transfer agent, very small concentrations can be employed. This is a particularly important advantage since large concentrations of the electron transfer agent, such as reducing metals, can break the emulsion or dispersion, promote side chain polymerization reactions and promote discoloration of the product polymers. Typically, the grams of electron transfer agent source per gram of monomer can be less than about 0.01 and preferably less than about 0.001. The free radical polymerization initiator source can also be employed in small concentrations; typically, in concentrations of less than about 0.02 grams per gram of monomer, preferably less than about 0.01 grams per gram of monomer.

Another advantage of the process of the present invention is that essentially all of the polymerization occurs in the aqueous emulsion and not on the surface of the electrode. Thus, polymerization can occur continuously without the need for removing or cleaning the electrodes. Hence, the present invention can proceed through a continuous mode operation.

It should be further appreciated that low amounts of energy can be employed. Since there is no direct utilization of electrons from an electrode source to form the polymerization initiator and it is not necessary to employ heat generation to activate polymerization, the present invention utilizes low amounts of energy to effect polymerization.

SPECIFIC EMBODIMENTS

The electrolytic cell used in the examples below consist of a 100 ml. titration vessel containing a cylindrical platinum gauze or a heavy platinum foil working cathode, a platinum wire counter anode and an SCE reference electrode with a double bridge (bridge to cell containing 0.1 molar sodium acetate which was adjusted to pH 5 with acetic acid and upper bridge containing 0.1 molar KCl). All experiments were begun at an ambient temperature (approximately 22° C.) and were blanketed with an argon atmosphere at atmospheric pressure. The argon gas stream was presaturated with monomer(s) and water by passage through a prebubbler containing the same amount and type of monomer(s) emulsion as in the polymerization cell.

Constant electric current was passed through the various aqueous systems described below while continually stirring the polymerization cell with a magnetic stirrer. All percentages below are by weight unless otherwise indicated.

EXAMPLE 1

An aqueous emulsion was prepared containing 21.6% methyl methacrylate (monomer), 0.72% sodium lauryl sulfate (emulsifier) and 77.68% deionized water. To 100 ml. of the above emulsion, 5.0 ml. of a 1.0% solution of potassium persulfate (free radical initiator source) and 1.0 ml. of a 1000 ppm Fe (III) solution as ferric chloride (electron transfer agent) were added. Thus, the final emulsion contained 3.3 parts sodium laurel sulfate, 0.23 parts potassium persulfate and 0.0046 parts Fe (III) per 100 parts of monomer. A constant current of −100 microamps were passed through the system for 112 minutes with samples being withdrawn in 2 minute intervals for 30 minutes and randomly thereafter for conversion tests. The results can be found in Table I.

EXAMPLE 2

An aqueous emulsion was prepared containing 26.37% of a 5/1 ratio of acrylonitrile/methyl acrylate, 0.92% sodium laurel sulfate and 72.71% of deionized water. The potassium persulfate and ferric chloride were added as above in Example 1 with the final emulsion containing 3.5 parts sodium lauryl sulfate, 0.19 parts potassium persulfate and 0.0038 parts Fe (III) per 100 parts of monomer. The polymerization was begun using −100 microamps of constant current. However, when the temperature rose rather steeply in the first 15 minutes of the reaction, the power was reduced to −50 microamps and at 71 minutes, the power was again reduced to −25 microamps. After 110 minutes, about 91.05% conversion was observed at a final temperature of 56° C. The results can be found in Table I.

TABLE I

| Time in Min | Example 1 *% Conversion at 100 μA | Example 1 % Solids | Example 2 *% Conversion at 100 μA | Example 2 % Solids |
|---|---|---|---|---|
| 2 | 5.65 | 1.22 | — | — |
| 4 | 8.19 | 1.77 | — | — |
| 5 | — | — | — | — |
| 10 | 18.15 | 3.92 | 1.04 | 0.27 |
| 15 | — | — | 4.78 | 1.26 |
| 16 | 29.44 | 6.36 | Current decreased to 50 MA | — |
| 20 | 38.66 | 8.35 | 7.45 | 1.97 |
| 30 | 58.66 | 12.67 | 13.67 | 3.60 |
| 40 | 68.52 | 14.80 | 20.66 | 5.45 |
| 50 | 74.34 | 16.06 | 29.90 | 7.89 |
| 70 | — | — | 55.10 | 14.53 |
| 71 | — | — | Current decreased to 25 MA | — |
| 90 | — | — | 88.17 | 23.25 |
| 110 | — | — | 91.05 | 24.01 |
| 112 | 81.98 | 17.71 | — | — |

*% Conversion = $\frac{\text{total solids} - \text{initial solids}}{\text{initial weight of monomer(s)}} \times 100$ "—" indicates that no readings were taken at that time.

EXAMPLE 3

An aqueous emulsion was prepared containing 29.2% of a 5/1 ratio of acrylonitrile/methyl acrylate, 10.52% by weight of the rubber component of a rubber latex (containing 70 parts butadiene-1,3, 30 parts acrylonitrile, 2.4 parts emulsifier-GAFAC RE-610 from General Aniline and Film Corp., 0.3 parts azo-bis-isobutyronitrile, 0.5 parts t-dodecyl mercaptan and 200 parts water prepared according to U.S. Pat. No. 3,426,102), 0.29% polymerization modifier-Q-43 from Cincinnati Milicron, 0.35% emulsifier-monowet 70R from Mona Industrial Inc., 0.088% stabilizer polyvinyl pyrrolidone and 59.55% deionized water. To 100 ml. of the above emulsion, 5.0 ml. of a 1% solution of potassium persulfate and 1.0 ml. of a 1000 ppm Fe (III) solution (as ferric chloride). The final emulsion contained 1.02 parts monowet 70R, 0.30 parts polyvinyl pyrrolidone, 0.98 parts Q-43, 36.0 parts rubber latex, 0.17 parts potassium persulfate and 0.0034 parts Fe (III).

Due to sampling difficulties, conversions were not monitored as a function of time in this experiment. At a constant current of −100 microamps for 105 minutes, about 94.0% total conversion was observed at a final temperature of 42° C., although a maximum temperature of 58° C. was reached at 71.5 minutes.

EXAMPLE 4

An aqueous emulsion was prepared by mixing 20.31 gms. of deionized water, 9.7 gms. of styrene, 0.2 gms. sodium lauryl sulfate, 0.02 gms. of ferric sulfate.n $H_2O$ and 0.02 gms. of EDTA (chelating agent). The mixture was placed in the cell and purged with argon for approximately 15 minutes. 0.02 gms. of para-methane hydroperoxide was mixed in 0.3 ml. of styrene (total styrene equals 10.0 gms.) and added to the cell. The final emulsion contained 203 parts water, 2.0 parts sodium laurel sulfate, 0.2 parts Fe sulfate.n $H_2O$, 0.02 parts EDTA and 0.2 parts para-methane hydroperoxide per 100 parts monomer. A constant potential of −0.20 volts was passed through the cell and after 90 minutes, the cell contained 10.07% total solids with a 28.2% conversion. Although the power was turned off, the polymerization continued and after 180 minutes there was 17.10% total solids in the cell with a conversion of 49.7%. The power was turned on to promote continued polymerization and 2.5 ml. of a 1% sodium laurel sulfate solution was added to the cell. After a total polymerization time of 330 minutes, the cell contained 21.50% total solids with a conversion of 68.6%.

The above examples have demonstrated that indirect electrolytic free radical initiation systems can be used to conduct emulsion polymerizations, including copolymerization reactions, and to obtain high yields and stable emulsions. Further, the process of the present invention results in essentially no accumulation of polymer on the electrode surfaces. The temperature of the systems can be regulated by controlling the exothermic polymerization via regulating the electric current flow through the cell.

Thus it should be apparent to those skilled in the art that the subject invention accomplishes the object set forth above. It is to be understood that the subject invention is not to be limited by the examples set forth herein. These have been provided merely to demonstrate operability and the selection of monomers, electron transfer agents, free radical initiators, aqueous emulsion systems and reaction conditions can be determined from the total specification disclosure provided without departing from the spirit of the invention herein disclosed and described. The scope of the invention includes equivalent embodiments, modifications and variations that fall within the scope of the attached claims.

What is claimed is:

1. An indirect process for electrolytically initiating the polymerization of ethylenically unsaturated monomer(s) by passing an electrical current through a two-phase system comprising: (a) a discontinuous organic phase, (b) a continuous aqueous phase capable of carrying an electric current, (c) a free radical source capable of forming a polymerization initiator, and (d) an electron transfer agent.

2. The process of claim 1 wherein the free radical source is selected from the group consisting of peroxides, persulfates, perborates, perphosphates and hydroperoxides.

3. The process of claim 2 wherein the free radical source is selected from the group consisting of hydrogen peroxide and persulfate salts.

4. The process of claim 1 wherein the free radical source is present in the system in a concentration less than about 0.02 grams per gram of monomer(s).

5. The process of claim 1 wherein the free radical source is present in the system in a concentration less than about 0.01 grams per gram of monomer(s).

6. The process of claim 1 wherein the electron transfer agent is a reducing metal having at least 3 valence states.

7. The process of claim 6 wherein the electron transfer agent is selected from the group consisting of iron, cobalt and copper.

8. The process of claim 7 wherein the electron transfer agent is iron.

9. The process of claim 1 wherein the electron transfer agent is present in the system in a concentration of less than about 0.01 grams per gram of monomer(s).

10. The process of claim 1 wherein the electron transfer agent is present in the system in a concentration of less than about 0.001 grams per gram of monomer(s).

11. The process of claim 1 wherein the ethylenically unsaturated monomer(s) are selected from the group consisting of alkyl acrylates, alkyl methacrylates, acrylonitrile, methacrylonitrile, styrene, butadiene or combinations thereof.

12. The process of claim 1 wherein the two-phase system contains an emulsifier.

13. The process of claim 12 wherein the emulsifier is ionic.

14. The process of claim 1 wherein the polymerization occurs essentially in the medium.

15. The process of claim 1 wherein the polymerization occurs essentially in the absence of oxygen.

16. The process of claim 1 wherein the process is continuous.

17. The process of claim 1 wherein the ethylenically unsaturated monomer(s) comprise a major portion of an ethylenically unsaturated nitrile and a minor portion of a monomer capable of forming a copolymer therewith polymerized in the presence of a rubbery polymer.

18. The process of claim 17 wherein the ethylenically unsaturated nitrile is acrylonitrile and the minor portion is an ester of an ethylenically unsaturated carboxylic acid.

19. The process of claim 18 wherein the ethylenically unsaturated carboxylic acid is acrylic acid.

20. The process of claim 17 wherein the rubbery polymer is selected from the group consisting of homopolymers and copolymers of conjugated diene monomers.

21. The process of claim 1 whereby essentially all of the polymerization occurs in said two-phase system.

22. The process of claim 1 wherein said monomers comprise insoluble monomers or monomers with low solubilities.

* * * * *